United States Patent [19]
Patterson

[11] Patent Number: 6,018,369
[45] Date of Patent: *Jan. 25, 2000

[54] VIDEO DECODER WITH CLOSED CAPTION DATA ON VIDEO OUTPUT

[75] Inventor: James T. Patterson, San Jose, Calif.

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/619,232

[22] Filed: Mar. 21, 1996

[51] Int. Cl.⁷ ...................................................... H04N 07/18
[52] U.S. Cl. ................... 348/461; 348/845.1; 348/845.2; 348/465; 348/423
[58] Field of Search ..................................... 348/423, 426, 348/390, 460, 461, 465, 468, 569, 473, 476, 478, 845.1, 845.2, 845.3

[56] References Cited

U.S. PATENT DOCUMENTS

| | | | |
|---|---|---|---|
| 5,157,489 | 10/1992 | Lowe | 348/390 |
| 5,315,386 | 5/1994 | Muramoto | 348/569 |
| 5,400,401 | 3/1995 | Wasilewski et al. | 380/9 |
| 5,428,400 | 6/1995 | Landis et al. | 348/569 |
| 5,438,370 | 8/1995 | Primiano et al. | 348/476 |
| 5,493,339 | 2/1996 | Birch et al. | 348/461 |
| 5,512,954 | 4/1996 | Shintani | 348/468 |
| 5,543,851 | 8/1996 | Chang | 348/468 |
| 5,566,089 | 10/1996 | Hoogenboom | 364/514 A |
| 5,574,505 | 11/1996 | Lyons et al. | 348/426 |

FOREIGN PATENT DOCUMENTS

| | | |
|---|---|---|
| 0 696 874 A2 | 7/1995 | European Pat. Off. . |
| 0 740 474 A2 | 4/1996 | European Pat. Off. . |
| WO 95/06391 | 8/1993 | WIPO . |
| WO 95/15660 | 12/1994 | WIPO . |

OTHER PUBLICATIONS

ISO/IEC 13818–2:1995, Information Technology—Generic coding of moving pictures and associated audio information: Video, pp. 28, 30, 42, 45, 46 Philips SAA 7184, Digital Video Encoder (DENC2–M6), Aug. 17, 1995, version 1.1.

*Primary Examiner*—Anand S. Rao
*Attorney, Agent, or Firm*—Kenneth L. Sherman, Esq.; Sherman & Sherman; Jeffrey P. Aiello, Esq.

[57] ABSTRACT

An arrangement and method for receiving a compressed video stream and generating a decompressed video signal and closed caption data therefrom employs a video decoder a video decompressor that decompresses the compressed video stream to generate a decompressed video signal. The video decoder has a closed caption data embedder that produces closed caption data contained in the compressed video stream for embedding into a video output signal of the video decoder. A single video signal output port is coupled to the video decompressor and the closed caption data embedder and produces the video output signal which includes the decompressed video signal and the embedded closed caption data.

15 Claims, 10 Drawing Sheets

VIDEO DECODER WITH CLOSED CAPTION DATA ON VIDEO OUTPUT

BACKGROUND OF THE INVENTION

Field of the Invention

The present invention relates to the field of video data processing, and more particularly, to an apparatus and a method for performing video decoding of digital video data with closed caption data.

DESCRIPTION OF RELATED ART

Federal Regulations require that televisions of a specified size have closed captioning capability. Broadcasters encode closed captioning data in portions of the video that are broadcast. Televisions decode the closed captioning data and display it on the screen with the video information. Closed captioning data assists the hearing impaired and people who do not have English as their native language to enjoy television. Closed caption encoding has been performed in the analog domain since television broadcasts have also been in the analog domain.

Relatively recent advances in technology have provided a digital means of transmitting video and audio data using image compression. As an example, the MPEG standard (Motion Pictures Experts Group) is a multimedia video playback standard that allows digital video to be compressed using a combination of image compression and a sophisticated form of differencing. A video sequence is encoded by recording differences between frames rather than entire images of each frame. The MPEG-2 standard supports high-quality digital video.

The MPEG standard was developed independently of television and did not originally consider closed captioning. As the desirability of delivering information in digital form to televisions has increased, features have been added to the MPEG standard in order to make it compatible with the requirements of television. These include the feature of providing closed captioning in the display of the data provided in the MPEG data stream. The recommended procedure for encoding closed captioning in the MPEG video stream is to provide the closed captioning data within the "user data" in the MPEG data stream. A block diagram of a prior art system for converting the input MPEG stream to an analog signal usable by a television is shown in the block diagram of FIG. 1.

The MPEG transport stream is provided to an MPEG transport demultiplexer (demux) 10. The MPEG transport stream is separated into an audio signal, a compressed video signal, and a user data signal. The audio signal is decoded by an MPEG audio decoder 12 and converted by a digital to analog converter 14 into a stereo analog signal. The compressed video signal is received by a video decoder 16 that decompresses the video signal according to a specified standard, such as CCIR-601 or CCIR-656. The decompressed video signal is converted to an analog signal by an analog video encoder 18, which provides a horizontal sync signal and a field signal to the video decoder 16. The analog signals generated by the analog video encoder 18 are the CVBS signal, the Y signal, and the C signal. The audio and the video signals are provided to a television set (not depicted in FIG. 1) through an RF modulator 20.

Figure 1:
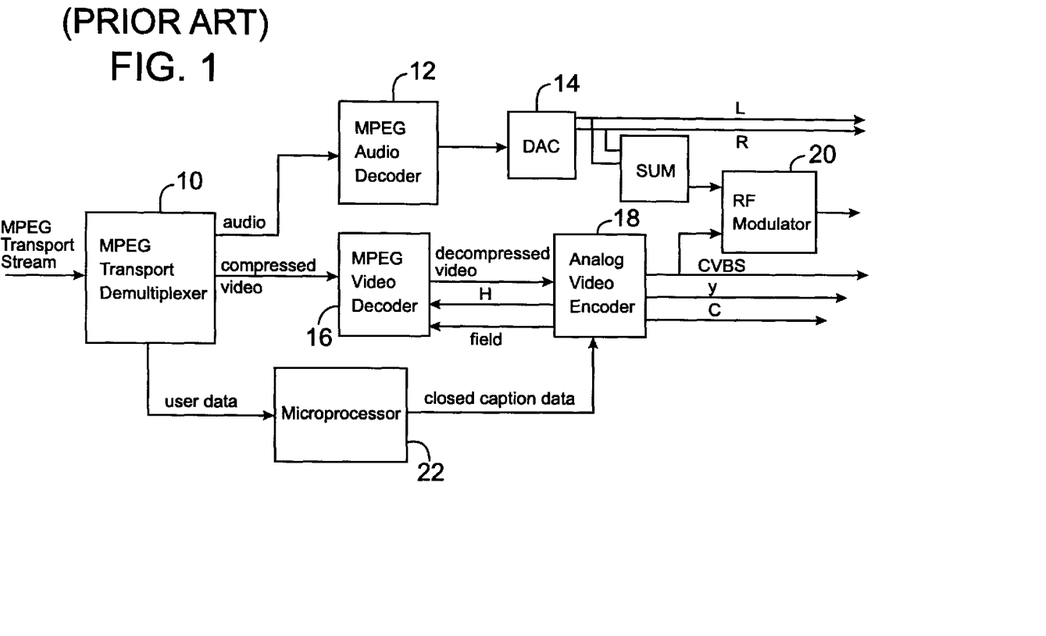
FIG. 1 is a block diagram of an arrangement according to the prior art for converting an MPEG transport stream into analog signals for use by a television.

The user data is separated from the compressed video data and provided to the analog video encoder via a separate interface, as depicted in FIG. 1. The user data is read by a microprocessor 22 which first checks the analog video encoder 18 to determine whether the original analog video encoder 18 is able to accept the closed caption data at that time.

Figure 2:
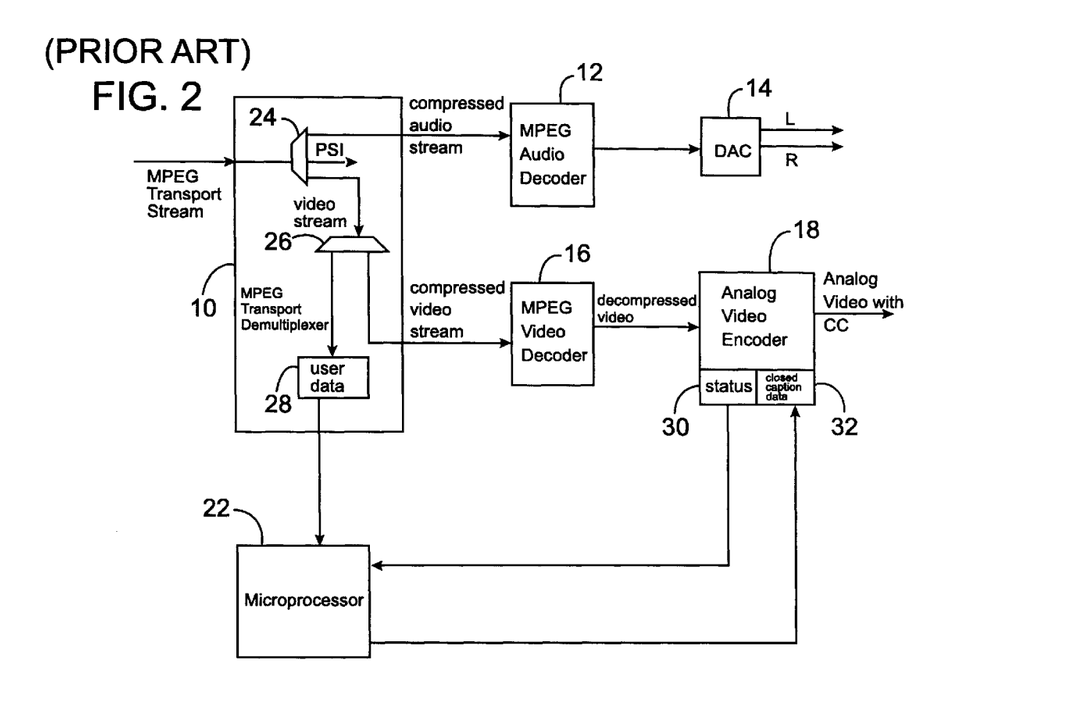
FIG. 2 is a block diagram depicting in more detail elements of the prior art arrangement of FIG. 1.

FIG. 2 is a more detailed depiction of portions of the prior art arrangement of FIG. 1. The transport demultiplexer 10 is depicted with demultiplexers 24 and 26. The transport demultiplexer 10 generates an interrupt when it receives the user data. The microprocessor receives that interrupt, retrieves the user data from a buffer 28 and temporarily stores it. The microprocessor 22 monitors the status of the analog video encoder 18 through a status register 30. The contents of the status register 30 provide an indication to the microprocessor 22 whether the analog video encoder 18 is able to receive closed captioned data. When the status register 30 indicates that the analog video encoder 18 is ready to receive closed captioned data, the microprocessor 22 forwards the user data originally stored in buffer 28 to the closed captioned data register 32 and the analog video encoder 18. Closed captioned data is normally sent when the vertical retrace signal is sent out by the analog video encoder 18.

The use of a microprocessor in the prior art, as depicted in FIGS. 1 and 2, has the disadvantage of requiring extra hardware (the microprocessor) and an extra layer of software to run the microprocessor in order to perform the function of inserting closed captioned data in the video stream. This extra layer of hardware and software to insert the closed captioned data within an analog video stream complicates the flow of data and adds expense to the device.

SUMMARY OF THE INVENTION

There is a need for a video decoder and method for receiving a compressed video bitstream with closed caption data embedded in the user data portion of the bitstream, decompressing the bitstream, and providing the closed caption data at the same data interface as the decompressed video bitstream.

This and other needs are met by the present invention which provides a video decoder for receiving a compressed video stream and generating a decompressed video signal and closed caption data therefrom. The video decoder comprises a video decompressor that decompresses the compressed video stream to generate a decompressed video signal, and a closed caption data embedder that produces closed caption data contained in the compressed video stream for embedding into a video output signal of the video decoder. A single video signal output port is coupled to the video decompressor and the closed caption data embedder and produces the video output signal comprising the decompressed video signal and the embedded closed caption data.

The video decoder of the present invention presents both the decompressed video stream and the embedded closed caption data at a single port, so that an analog video encoder may receive this information at a single input port. This eliminates the need for microprocessor and software intervention in the retrieving, storing and metering of closed caption data, thereby reducing complexity and costs of the system.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 3:
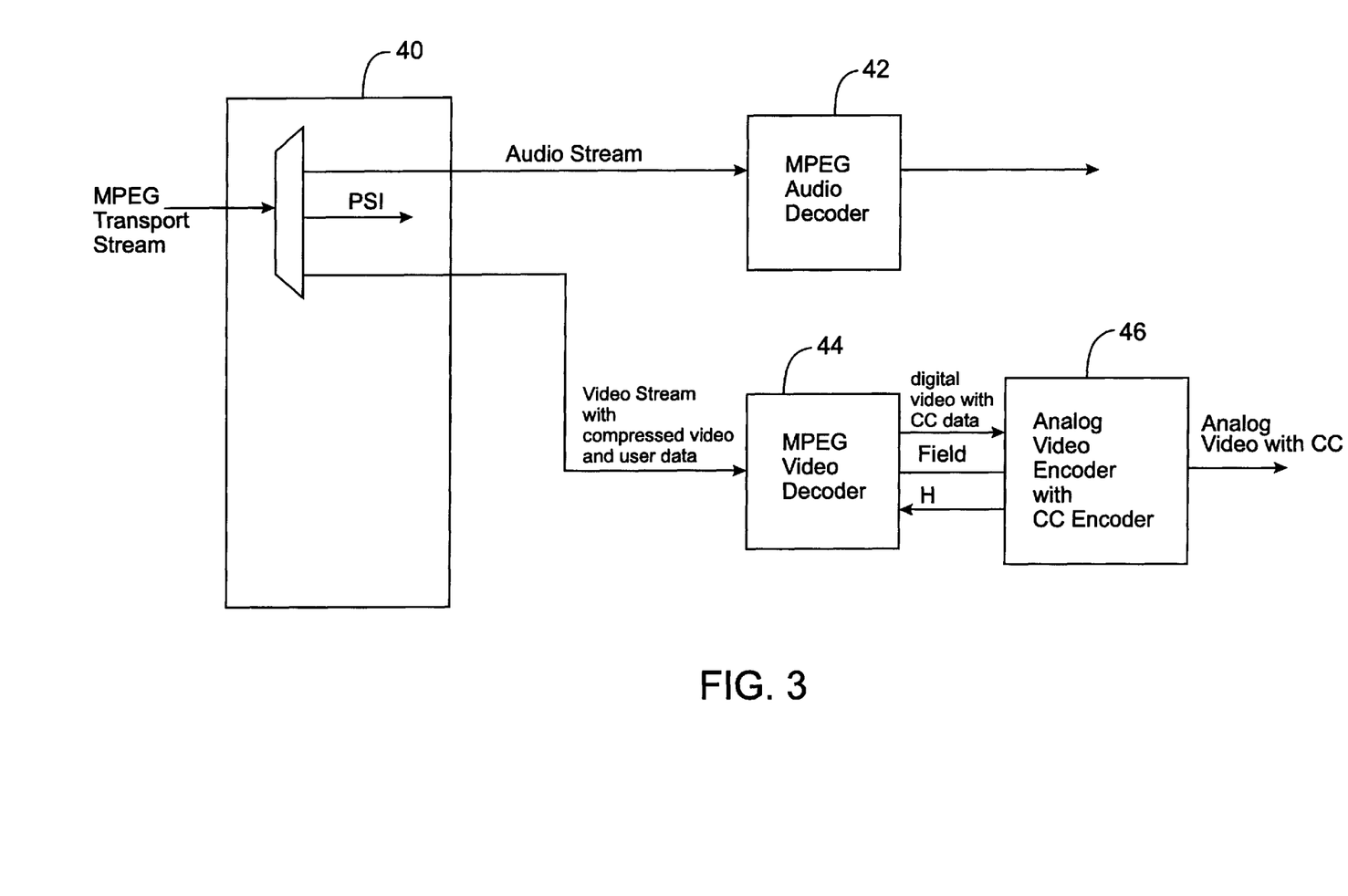
FIG. 3 is a block diagram of an arrangement for converting a transport stream into analog signals constructed in accordance with an embodiment of the present invention.

FIG. 3 is a block diagram of a conversion arrangement for converting a transport stream, such as an MPEG transport stream, into analog signals suitable for use by a conventional television set.

The arrangement includes a transport demultiplexer 40 which demultiplexes the transport stream, such as an MPEG transport stream, into an audio stream and a video stream. The MPEG transport stream also includes a PSI stream.

The demultiplexed audio stream is provided to an MPEG audio decoder 42, which converts the digital audio stream into an analog audio signal. The video stream, which comprises compressed video and user data, is sent to an MPEG video decoder 44. The video stream is decoded by the MPEG video decoder 44 into a decompressed digital video stream with closed captioned data. Exemplary embodiments of a video decoder usable in the arrangement of FIG. 3 is described in more detail later and are depicted in FIGS. 8–11. The decompressed video and closed captioned data is received at a single input port interface at an analog video encoder 46 that includes a closed caption encoder. The analog video encoder 46 converts the digital video signal and inserts the closed captioned data sent with the digital video signal and received at the single interface of the analog video encoder 46 into analog signals usable by a conventional television receiver.

The arrangement of FIG. 3 avoids the use of a microprocessor 22 which polls a status register in the analog video encoder 18 and which supplies closed caption data from the MPEG transport demultiplexer 10 to a separate interface of the analog video encoder 18, as in FIGS. 1 and 2. The elimination of a microprocessor and a separate interface for the closed captioned data at the analog video encoder reduces the cost of the arrangement (due to the decrease in hardware). The complexity of the arrangement is also reduced since the software to operate the microprocessor to poll the analog video encoder to properly time the sending of the closed captioned data to the analog video encoder is eliminated.

Figure 4:
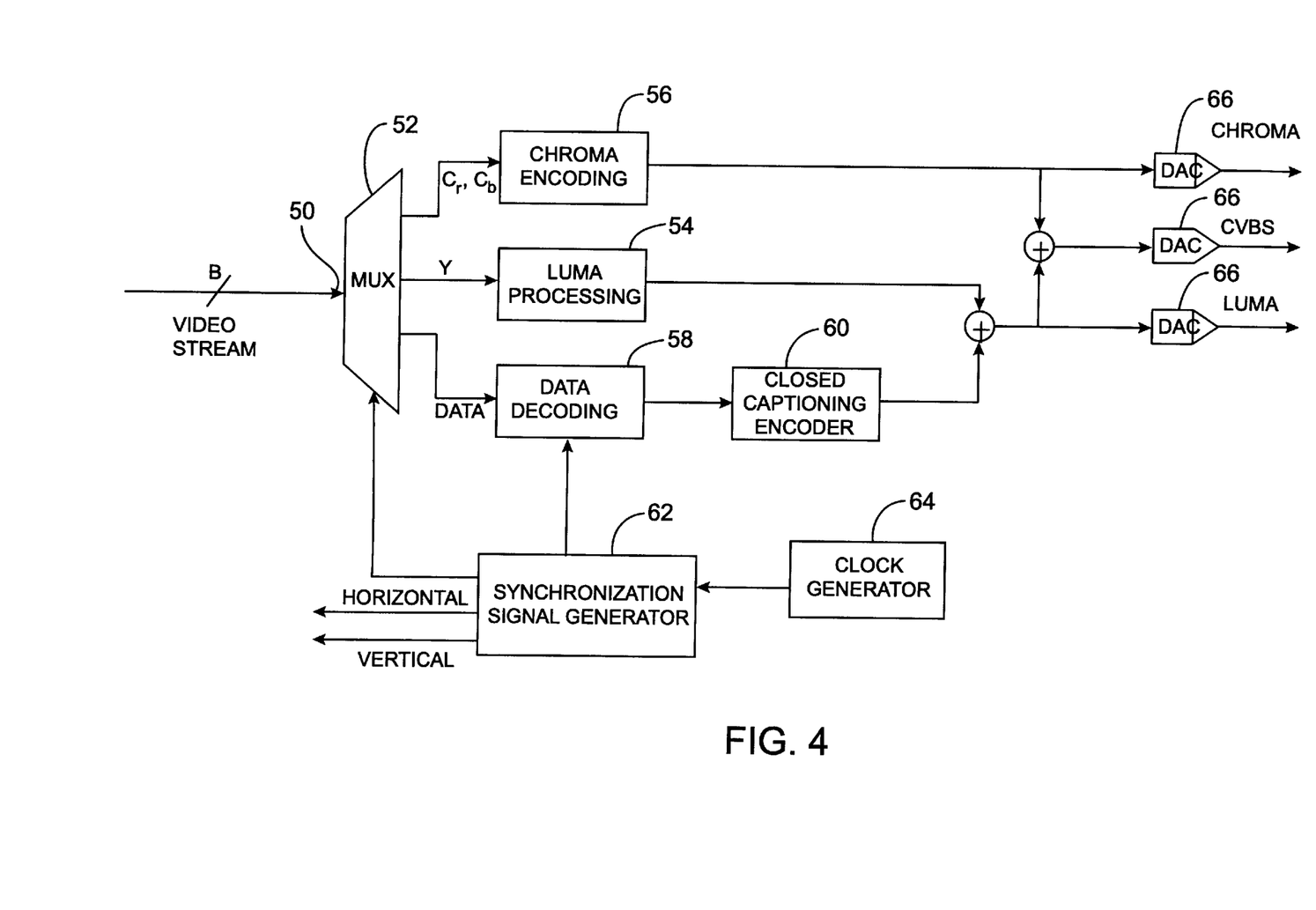
FIG. 4 is an analog video encoder constructed in accordance with an embodiment of the present invention.

An embodiment of the analog video encoder 46 depicted in FIG. 3 is provided in the block diagram of FIG. 4. The analog video encoder of FIG. 4 is suitable for converting a decompressed video signal that conforms to the CCIR-601 standard. Currently the CCIR-601 mode is the most popular in MPEG systems because the analog video encoder is used as the display synchronization master. This means that the analog video encoder generates the horizontal and field signals for the MPEG video decoder 44 of FIG. 3.

The video data stream received at the single video input interface 50 of the analog video encoder 46 is an 8-bit video stream, for example. The video data stream is in CCIR-601 mode with closed caption data added. The CCIR-601 video data is multiplexed luma (Y) and chroma (Cr, Cb). It is in the sampling format referred to as 4:2:2, which means that the active video signal of each line of video appears in the following order: Cb, Y, Cr, Y, Cb, Y, Cr, Y, . . . . During the active video time, the demultiplexer 52 of the analog video encoder 46 sends the multiplexed luma samples through a luma processor 54. Also during this active video time, the demultiplexer 52 provides the chroma (Cr, Cb) to a chroma encoder 56. The demultiplexer 52 sends the video data stream to a data decoder 58 during the non-active video time.

The luma processor 54 receives the luma signal arriving at 13.5 MHz rate and interpolates the signal to 27 MHz. This eases design requirements of analog anti-imaging filters on digital to analog convertor outputs. In addition, any luma filtering such as bandwidth reduction or chroma notch filtering, is performed at the luma processor 54.

The chroma encoder 56 receives the Cr and Cb data and scales this data properly for chroma encoding. The chroma encoder 56 also generates and asserts color bursts into the output signal. The chroma bandwidth is also reducible using the chroma encoder 56.

The data decoder 58 examines the video data stream sent to it by the demultiplexer 52 for a sequence of bytes that indicates the presence of closed captioned data. Depending on the protocol established between the MPEG video decoder 44 and the analog video encoder 46, the sequence of bytes occurs at a certain time during a non-active video time.

As an example, assume that the sequence is 0, 255, LN, CC_1, CC_2, Chk_sum1, and Chk_sum2. In this sequence, 0, 255 is the start sequence. LN is the line number where the closed captioned data is to be encoded. CC_1 is the first byte of closed captioned data. CC_2 is the second byte of closed captioned data. Chk_sum1 is the seven most significant bits of the check sum and Chk_sum2 is the seven least significant bits of the check sum. The upper bit of Chk_sum1 and Chk_sum2 are set to 0 to prevent false start sequence emulation. The start sequence is unique since, according to the EIA608 recommendation, all of the closed captioned data types are ASCII. They are also limited to a range from 16 to 127.

Figure 6:
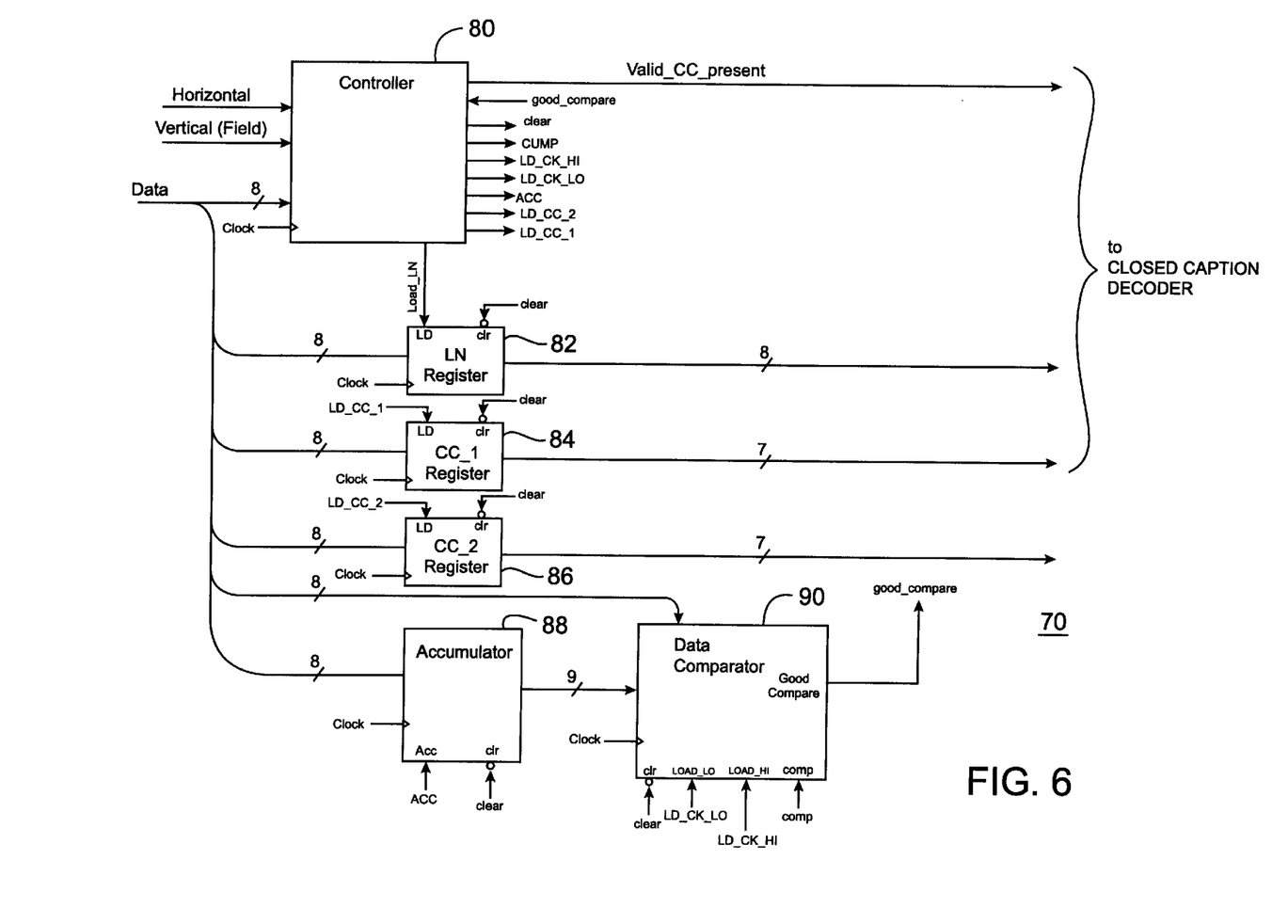
FIG. 6 is a block diagram of a data decoder constructed in accordance with an embodiment of the present invention for use in the analog video encoder of FIG. 4.

FIG. 6 is a block diagram of a data decoder constructed in accordance with an embodiment of the present invention that may be used in the embodiment of the analog video encoder of FIG. 4. A controller 80 receives the data stream (CCIR-601 data), the horizontal timing reference signal and the vertical (field signal) timing reference. When the controller 80 recognizes a transition on the field signal, it clears an LN register 82, a CC_1 register 84, a CC_2 register 86, an accumulator 88, and a data comparator 90 by setting the clear signal low for one clock cycle. The controller 80 also sets the following output signals low: Valid_CC present, COMP, LD_CK_HI, LD_CK_LO, ACC, LD_CC_1, and LD_CC_2.

At the next falling edge of the horizontal signal after the transition of the field signal the controller 80 starts looking for the start sequence. After the controller 80 receives the start sequence of 0, 255, it enables the LN register 82 by setting LOAD_LN high.

On the next clock, the controller 80 enables loading of the CC_1 register 84 by setting LD_CC_1 high. The controller 80 also enables the accumulator 88 by setting ACC high. The LN register 82 is disabled by the controller 80 setting LOAD_LN low.

On the next clock, the controller 80 enables loading of the CC_2 register 86 by setting LD_CC_2 high and disables CC_1 register loading by setting LD_CC_1 low. On the next clock, the controller 80 disables the accumulator 88 by setting ACC low. The CC_2 register loading is disabled by the controller 80 setting LD_CC_2 low. The controller 80 also instructs the data comparator 90 to load the first byte of the check sum (Chk_sum1) by setting LD_CK_LO high. On the next clock, the controller 80 instructs the data comparator 90 to load the second byte of the check sum (Chk_sum2) by setting LD_CK_HI high and setting LD_CK_LO low.

On the next clock, the controller 80 instructs the data comparator 90 to compare the check sum (formed with Chk_sum1 and Chk_sum2) with the nine-bit value from the accumulator 88. This is accomplished by the controller 80 setting LD_CK_HI signal low and setting the COMP signal high. If the values compare "OK", the data comparator 90 sets the GOOD_COMPARE signal high. If the values do not compare "OK", then the data comparator 90 maintains the GOOD_COMPARE signal low.

In response to the GOOD_COMPARE signal being high, the controller 80 on the next clock sets the Valid_CC_present signal high. If the GOOD_COMPARE signal is low, then the controller 80 leaves the Valid_CC_present signal low and clears the LN register 82, the CC_1 register 84, the CC_2 register 86, the accumulator 88 and the data comparator 90 by setting the CLEAR signal low for one clock cycle. The controller 80 then returns to examining for a field signal transition to begin the process again.

The protocol may be a three step process. For example, the analog video encoder 46 may make a transition on the field signal. When the analog video encoder 46 generates the next falling edge of the horizontal signal, the analog video encoder 46 expects to receive the sequence of bytes described above at its digital video input interface 50. If the above sequence of bytes is not seen, then the data decoder 58 does not encode data in the next line 21.

Referring to FIG. 4, a closed captioning encoder 60 is coupled to the output of the data decoder 58. When enabled, the closed captioning encoder 60 automatically generates seven cycles of clock running (32×line rate) start bit insertion (001) and finally insertion of the two data bytes per line. Data bits are encoded so that logic low at the video outputs corresponds to zero IRE and logic high corresponds to 50 IRE. This conforms to FIG. 1, section 2.2 of standard EIA-608. The EIA-608 is the recommended practice for line 21 data service.

The analog video encoder 46 includes a synchronization signal generator 62 that receives a 27 MHz clock signal from clock generator 64 and generates all of the horizontal and vertical timing references. Included in the horizontal references are the "start of active video," "end of active video," and "burst gate flag". The synchronization signal generator 62 provides the external horizontal and field signals to the MPEG video decoder 44. The select signals for the demultiplexer 52 are also provided by the synchronization signal generator 62.

The clock generator 64 generates a clock signal that is 32 times the line rate clock for the closed captioning encoder. This clock signal is locked to the horizontal timing reference.

The outputs of the chroma encoder 56, luma processor 54, and the closed captioning encoder 60 are provided as inputs to digital to analog converters (DACxs) 66. These digital to analog converters convert the digital signals to analog chroma, CVBS, and luma signals suitable for use by a conventional television apparatus.

In operation of the analog video encoder 46 of FIG. 4, the synchronization signal generator 62 will send a synchronization signal, either the horizontal or field signal, to the video decoder 44 (depicted in FIG. 3). In response, the video decoder 44 will order two bytes of closed captioned data within a predetermined time (i.e., a certain number of data bytes) after the synchronization signal has been sent by the synchronization signal generator 62. The synchronization signal generator 62 will, at the appropriate time after sending its synchronization signal to the video decoder 44, control the demultiplexer 52 to provide the video data to the data decoder 58. The synchronization signal generator 62 will also control the data decoder 58 at this time. The data decoder 58 will search for the sequence of bytes that indicates closed captioned data is present. If the data decoder 58 determines that the closed captioned data is present, it provides this data to the closed captioning encoder 60, which automatically generates the appropriate cycles of clock running, start bit insertion and insertion of the two data bytes per line. The signal output by the closed captioning encoder 60 is combined with the signal from the luma processor 54, and the chroma encoder 56.

According to certain embodiments of the present invention, the closed captioned data is sent to the analog video encoder following a specific preamble of data bytes during a blanking interval. In other embodiments, the closed captioned data is sent to the analog video encoder by the video decoder 44 during a vertical synchronization period.

Figure 5:
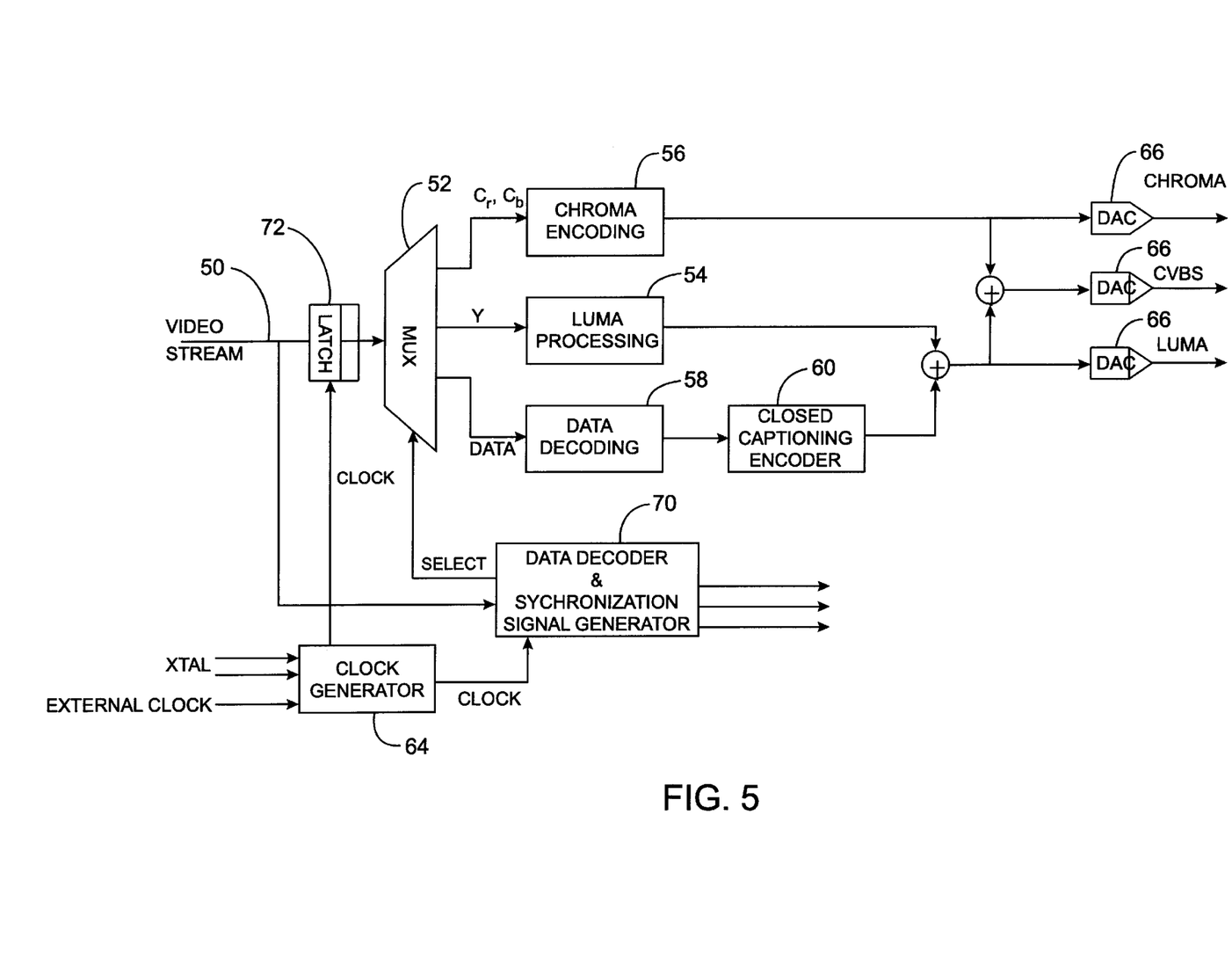
FIG. 5 is a block diagram of an analog video encoder constructed in accordance with another embodiment of the present invention.

FIG. 5 is a block diagram of another embodiment of the analog video encoder 46, this embodiment being suitable for converting data that is in CCIR-656 mode. A CCIR-656 data is a super set of CCIR-601. The data includes horizontal timing information, vertical timing information and ancillary data. Since the video signal itself contains the horizontal timing information and vertical timing information (as well as the ancillary data), the analog video encoder 46 does not act as the display synchronization master. Instead, the data decoder and synchronization signal generator 70 in the embodiment of FIG. 5 receives the video stream directly at the single video interface 50. The synchronization signal generator 70 also has a data decoder which examines the video stream to determine whether the ancillary data contains closed captioning data. If so, the data decoder and synchronization signal generator 70 will cause the demultiplexer 52 to send the ancillary data to the data decoder 58.

The chroma encoder 56, luma processor 54 and closed captioning encoder 60 operate in the same manner as in the embodiment of FIG. 4 and their description of operation will not be repeated.

A latch 72 is provided at the single input interface 50 and before the demultiplexer 52 to latch the video stream as it is being input into the analog video encoder 46. This provides the data decoder and synchronization signal generator 70 with time to examine the video stream to determine the selection of the demultiplexer and correctly route the data between the chroma encoder 56, luma processor 54 and data decoder 58.

In operation, the video stream contains the ancillary data that has closed captioned data within it. The ancillary data may include code data which indicates that closed captioned data follows the code data within the ancillary data. This is detected by the data decoder and synchronization signal generator 70 while the video stream is latched in latch 72. When the data decoder and synchronization signal generator 70 identifies a 0, 255, and timing information byte sequence in the data stream to the analog video encoder 46, the generator 70 becomes aware that it is receiving ancillary data. The generator then waits for a byte sequence that indicates that the ancillary data has closed caption data embedded. Once the generator 70 identifies that byte sequence, it informs the data decoding module 58 that closed captioned data is embedded by setting a CC_Embedded signal high. Data decoder and synchronization signal generator 70 causes the demultiplexer 52 to route the video stream to the data decoder 58. In certain embodiments, the closed captioned data follows the code data by a predetermined amount of bytes. In other embodiments, the closed captioned data follows the code data by an amount of bytes (or lines) indicated by information in the code data. This allows the timing of the receipt of the closed captioned data to be variable.

Figure 7:
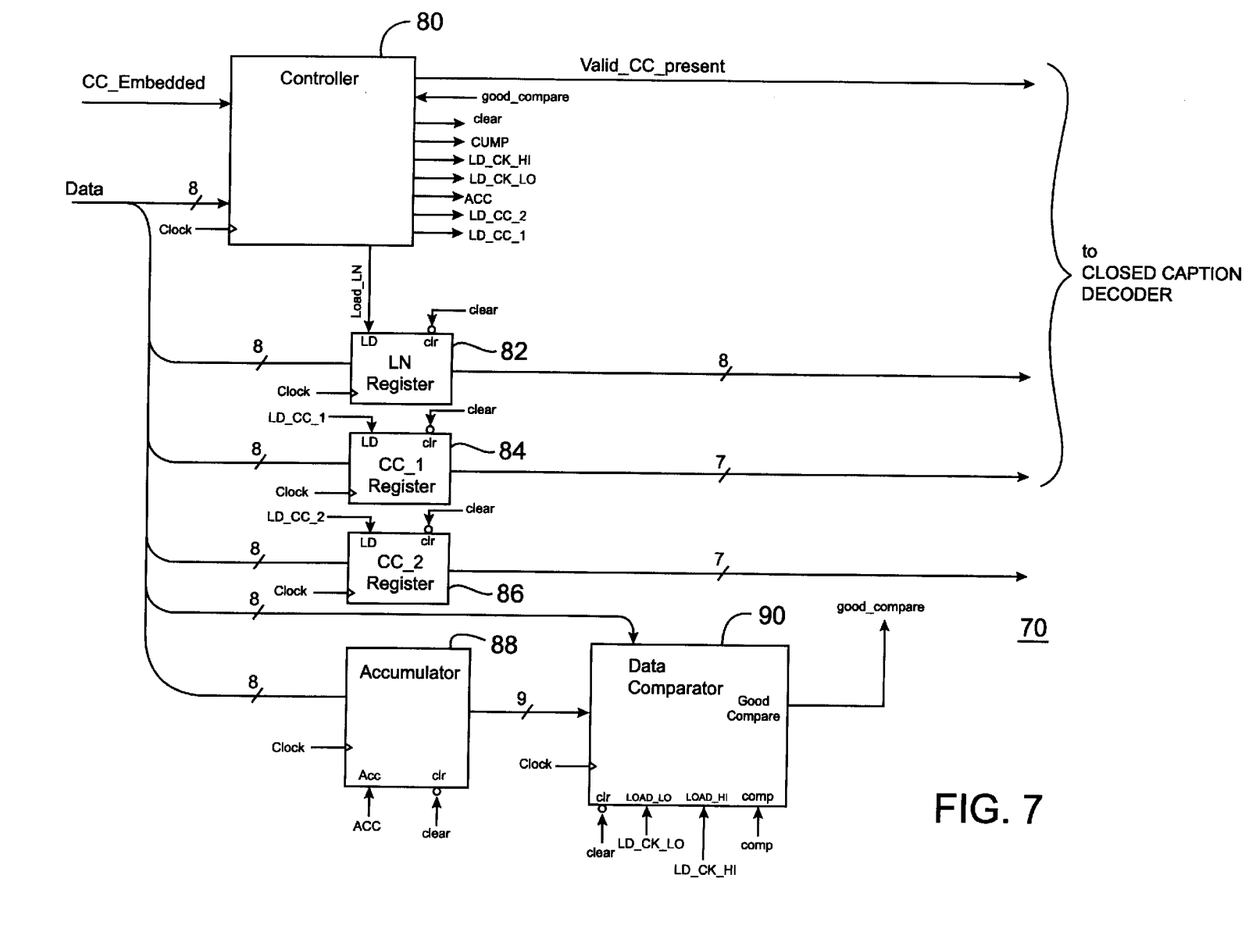
FIG. 7 is a block diagram of a data decoder constructed in accordance with an embodiment of the present invention for use in the analog video encoder of FIG. 5.

The data decoder of FIG. 7 is similar to that of FIG. 6, and therefore its components have the same reference numerals as used in FIG. 6. However, the controller 80 in the embodiment of the data decoder of FIG. 7 is responsive to the CC_Embedded signal asserted by the data decoder and synchronization signal generator 70, instead of the field signal transition. The detailed operation of the data decoder of FIG. 7 is otherwise the same as that of FIG. 6.

Figure 8:
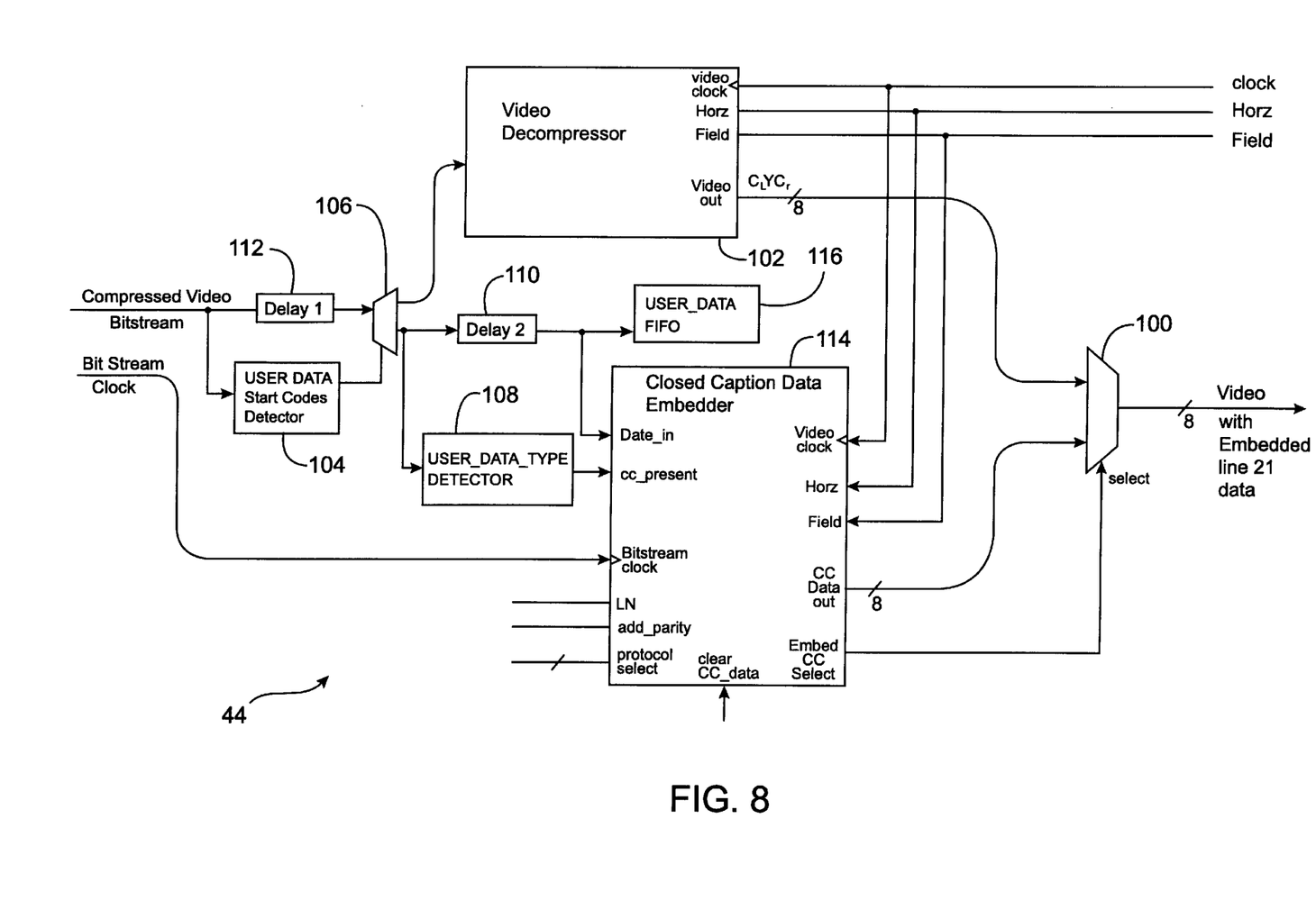
FIG. 8 is a block diagram of a video decoder with closed caption embedder constructed in accordance with an embodiment of the present invention and used in the arrangement of FIG. 3, when configured with an analog video encoder as depicted in FIGS. 4 and 6.

An exemplary embodiment of a video decoder 44 for use with the analog video encoder of FIG. 4 is depicted in FIG. 8. Accordingly, the decompressed digital video that is produced at the output of this embodiment of the video decoder is in the CCIR-601 mode. In this mode, the analog video encoder 46 is used as the display synchronization master, and the CCIR-601 mode bitstream is just digital video.

As an overview of its functionality, the video decoder 44 receives closed caption data (or other data for encoding in line 21 of the vertical blanking interval of analog video) embedded in the user data portion of the compressed video bitstream. If the video decoder 44 determines that the user data is closed caption data (or other data for line 21 encoding), then the video decoder 44 will send out the data at a rate of two bytes per field, on the same data interface used for the decompressed digital video output. For the embodiment of FIG. 10, in which the output digital video is CCIR-656 data, then the closed caption data may be encoded as ancillary data. If the output digital video is CCIR-601, then the closed caption data may be presented at a certain time (such as during the vertical sync) or after a certain preamble of bytes during a blanking interval.

In the CCIR-601 mode, the video decoder 44 is not the display synchronization master. This means that the display horizontal and field synchronization signals are generated externally for the video decoder 44. As described earlier, in the CCIR-601 mode the video data is multiplexed luma (Y) and chroma (Cr, Cb). It is in the sampling format referred to as 4:2:2, which means that the active video signal of each line of video appears in the following order: Cb, Y, Cr, Y, Cb, Y, Cr, Y, . . . . During the active video time, the second multiplexer 100 of the video decoder 44 of FIG. 8 sends the Cb, Y and Cr data from a video decompressor 102 to the outputs of the video decoder 44. During the non-active video time, the second multiplexer 100 is able to send the byte sequence that contains closed caption data to the video output of the video decoder 44.

A user data start code detector 104 scans the compressed video bitstream for user data start codes. User data may be in the sequence layer, the group of picture (GOP) layer, or the picture layer, as described in Motion Picture Experts Group Video, ISO/IEC 13818-2:1995, Information Technology—Generic coding of moving pictures and associated audio information: Video. When the user data start code detector 104 sees user data start sequences, the detector 104 controls a first demultiplexer 106 to send the bitstream to a user data type detector 108 and a second delay 110. A first delay 112 compensate for the processing delay of the user data start code detector 104.

The user data type detector 108 examines the user data type field in the user data bitstream to determine if it is closed caption data (or data for line 21 encoding). The user data type field will be 08 (in hexadecimal format) if the user data is closed caption data. The field will be 09 (in hexadecimal) if it is data for line 21 encoding. If the user data is closed caption or data for line 21 encoding, then the user data type detector 108 informs a closed caption data embedder 114 that the data it is receiving should be processed by setting CC_present signal high. The second delay 110 compensates for the processing delay of the user data type detector 108.

The video decompressor 102 receives the compressed video bitstream and produces uncompressed digital video in a conventional manner. The digital video output of the video decompressor 102 has CCIR-601 levels, in which the luma values range from 16 to 235, the Cr and Cb value range from 16 to 240.

A user data FIFO (first-in, first-out buffer) 116 holds all of the user data that is received in the compressed video bitstream. The user data may contain other data that is not closed-caption data that the rest of the system may need.

Figure 9:
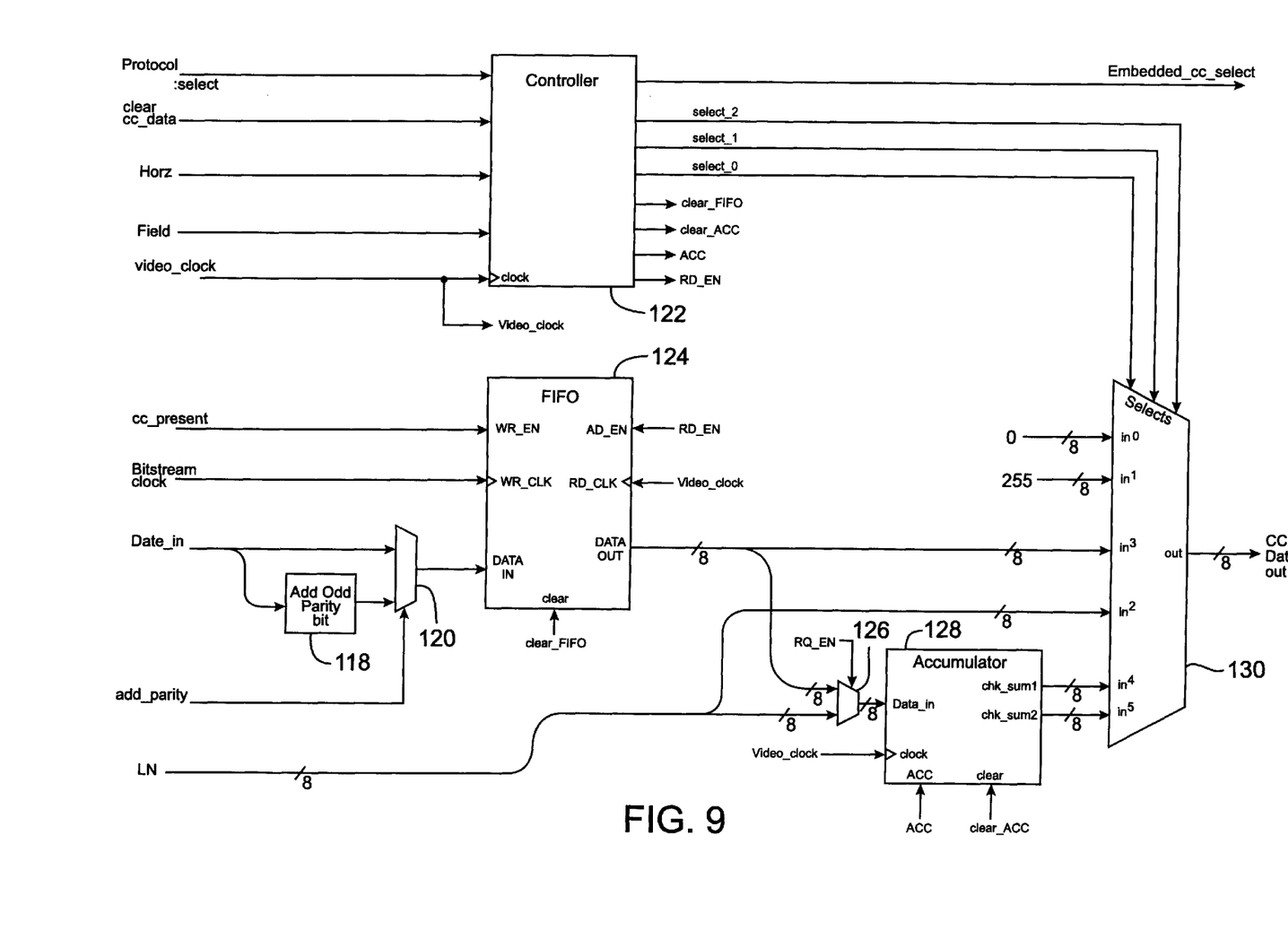
FIG. 9 is a block diagram of a closed caption data embedder constructed in accordance with an embodiment of the present invention and used in the video decoder of FIG. 8.

The closed caption data embedder 114 receives the closed caption user data and sends it out on the CC_data_out port. An embodiment of the data embedder 114 used for the CCIR-601 mode (where the video decoder 44 is slaved to the external video synchronization signals) is depicted in FIG. 9.

When the CC_present signal is high, the embedder 114 knows that the bitstream data at the Data_in port is closed caption data or data for line 21 encoding. The embedder 114 uses the bitstream clock to clock in the data on the Data_in port.

The LN port is the line number during the vertical blanking interval of video where the closed caption data is to be encoded. In most applications, the line number will be 21.

The Add-parity port informs the embedder 114 to add an odd parity bit to the closed caption data before sending it out of the video decoder 44. The data for closed captioning or line 21 is 7 bits of data with one odd parity bit. It may not be desired to add the parity bit if data other than closed caption data or line 21 data is to be sent out of the video decoder 44 on the digital video outputs. Another instance where it is not desirable for the video decoder 44 to add the odd parity bit is when the analog video encoder 46 adds the odd parity bit itself when encoding the data.

The protocol select port informs the embedder 114 what type of protocol to use for placing the closed caption data on the digital video output ports. A very simple example of protocol may be to put only the two closed caption bytes out on the video output port on the first horizontal edge after a field transition. The closed caption data is always encoded on line 21 of the present field. This protocol may be adequate for the case when the video decoder 44 is directly connected to the analog video encoder 46.

An example of a flexible and more robust protocol involves generating a byte sequence that has a start sequence, line number, closed caption data and check sum values. The byte sequence may then be provided as an output at a certain time (determined by the protocol) during the vertical blanking interval. This exemplary protocol would be especially useful for embodiments in which the digital video out of the video decoder 44 passes through another module (such as a graphics overlay module) prior to the analog video encoder 46. The extra module between the video decoder 44 and the analog video encoder 46 at times may corrupt the data during the blanking interval. This may occur during graphics mode changes.

In a very robust and complicated protocol, the byte sequences are output with error correction more than once.

An example of the second protocol mentioned above will be described in more detail below. The embedder 114 produces a sequence of bytes that include closed caption data. Depending on the protocol established between the video decoder 44 and the analog video encoder 46, the sequence of bytes occurs at a certain time during the non-active video time. As an example, assume the sequence is: 0, 255, LN, CC_1, CC_2, Chk_sum1, Chk_sum2. The start sequence is represented by 0, 255. LN represents the line number where the closed caption data is to be encoded. CC_1 is the first byte of closed caption data. CC_2 is the second byte of closed caption data. Chk_sum1 and Chk_sum2 form the check sum of LN, CC_1 and CC_2. Chk_sum1 represents the 7 most significant bits of the check sum and Chk_sum2 the 7 least significant bits. The upper bit of Chk_sum1 and Chk_sum2 are each set to 0 to prevent false CCIR-656 start sequence emulation.

The start sequence is unique since, according to the EIA608 recommendation, all of the closed caption data types are ASCII. The data types are also limited to a range from 16 to 127.

The protocol may be a three-step process. The analog video encoder 46 makes a transition on the field signal. When the analog video encoder 46 generates the next falling edge of horizontal, it expects to receive the sequence of bytes shown above on its digital video input. If it does not see the above sequence of bytes with a valid check sum, then it assumes that there is no valid closed caption data available for encoding.

The Clear CC_data pin is brought low to clear the internal memory of the embedder 114. This is normally done whenever the user changes channels or program streams. The video clock is used to clock the eight-bit data out of the CC_data out port.

The CC_data out port is where the eight-bit data sequence that contains closed caption data exits the embedder 114. The closed caption data exits the port at the proper rate and at the proper time. In other words, there are only two closed caption bytes that are sent every odd field (and only two bytes sent for line 21 encoding per field). They occur at the right time, such as after the first horizontal edge after a field signal transition.

The Embed CC Select signal informs the second multiplexer 100 when the byte sequence containing closed caption data is exiting the embedder 114. When the data sequence is generated out of the embedder 114, the second multiplexer 100 sends the data sequence out on the digital video output port of the video decoder 44. At all other times, the Embed CC Select signal directs the second multiplexer 100 to send the digital video from the video decompressor out on the digital video output port of the video decoder 44.

The horizontal pin of the embedder 114 receives the horizontal synchronization signal. The field pin receives the field synchronization signal.

The second multiplexer 100 sends either the digital video from the video decompressor 102 or the byte sequence from the embedder 114 to the digital video output port of the video decoder 44. The selection is made through the select pin (the Embed CC Select signal from the embedder 114).

An embodiment of the embedder 114 to implement the exemplary second protocol is depicted in FIG. 9. This embodiment includes a controller 122, a FIFO 124, an accumulator 128 and a multiplexer 130.

The controller 122 uses the FIFO 124 to store incoming closed caption data and meter this data out two bytes per field. The bitstream will not be running at the same clock rate as the Video_clock and the closed caption data into the embedder 114 my be burst. The bitstream clock is connected to the WR_CLK (write clock) pin of the FIFO 124, and CC_present is connected to the WR_EN (write enable pin of the FIFO 124). Data is written into the FIFO 124 on every rising edge of the bitstream clock whenever the CC_present signal is brought high. Data is read from the FIFO 124 on every rising edge of Video_clock whenever RD_EN (read enable) is high.

The accumulator 128 generates a check sum by adding LN and the two closed caption bytes. This number is more than eight bits so it is put in Chk_sum1 and Chk_sum2.

If the add_parity signal is high, then incoming closed caption data has an odd parity bit added to it before it is written into the FIFO 124. The controller 122 sets the Embedded CC Select signal high when it is sending out the embedded closed caption byte sequence.

The initial state of the controller 122 has the RD_EN and the ACC signals in their inactive low state. The clear_ACC signal is in its active low state. The clear_FIFO signal is in its inactive high state. When it is supposed to send out the closed caption byte sequence, the controller 122 will perform the following sequence of actions.

On the first rising clock edge, a zero is sent out on the CC data out port by selecting the in0 port of the multiplexer 130. The clearing of the accumulator 128 is stopped by setting the clear_ACC signal high.

On the next rising clock edge, 255 is sent out on the CC data out port by selecting the in1 port of the multiplexer 130. The ACC signal is set high so that the accumulator 128 starts accumulating on the next rising clock edge. RD_EN is already low so that multiplexer 126 sends the LN byte to the accumulator 128.

On the next rising clock edge, the controller 122 sends LN out on CC data out port by causing the multiplexer 130 to select the in2 port. The RD_EN signal is set high. This allows the Video_clock read out the next closed caption data byte for multiplexers 126 and 130. Setting RD_EN high also causes multiplexer 126 to send the closed caption data from the FIFO 124 to the accumulator 128.

On the next rising clock edge, the controller 122 sends out the first closed caption byte from the FIFO 124 by causing the multiplexer 130 to select the in3 port. The reading of the closed caption data out of the FIFO 124 is stopped by setting RD_EN low. The accumulator 128 stops accumulating in response to the controller 122 setting the ACC signal low.

On the next rising clock edge, the first check sum byte (Chk_sum1) by causing the multiplexer 130 to select the in4 port.

On the next rising clock edge, the controller 122 sends out the second check sum byte (Chk_sum2) by causing the multiplexer 130 to select the in5 port. This is the end of the closed caption data sequence, so that on the next rising clock edge, the controller 122 clears the accumulator 128 be setting the clear_ACC low. The controller 122 sends a 0 out on the CC data out port by selecting the in0 port of multiplexer 130.

When the clear_CC data is brought low, the controller 122 clears the contents of the FIFO 124 and the accumulator 128. The controller 122 returns to its initial state and waits for proper conditions (determined by the protocol select) before starting a new closed caption data byte sequence.

Figure 10:
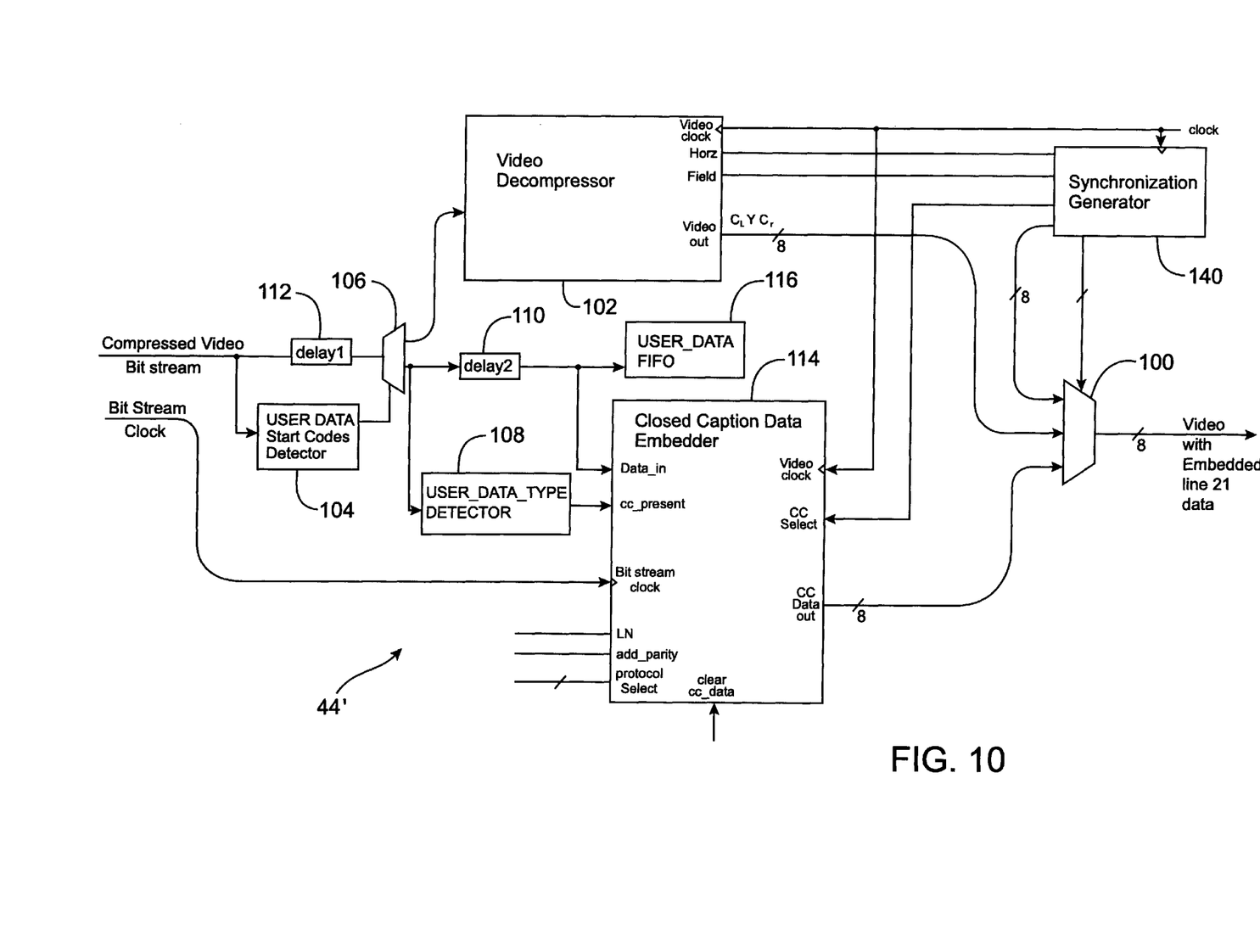
FIG. 10 is a block diagram of a video decoder with closed caption embedder constructed in accordance with an embodiment of the present invention and used in the arrangement of FIG. 3, when configured with an analog video encoder as depicted in FIGS. 5 and 7.

Another embodiment of a video decoder is depicted in FIG. 10, this embodiment being particularly suitable in arrangements in which the video decoder 44' does not receive external horizontal and field signals for display synchronization. Instead, the video decoder 44' generates all synchronization signals. The video decoder of FIG. 10 is used, for instance, with the analog video encoder 46 of FIG. 5, and in the CCIR-656 mode, for example. The video decoder of FIG. 10 is similar to that of FIG. 8, so that description of elements common to these two embodiments will not be repeated.

The video decoder 44 in the embodiment of FIG. 10 has a synchronization module 140 with a data encoding section that generates the SAV, EAV (start of active video, end of active video) and ancillary data. The synchronization module 140 controls multiplexer 100 to cause it to output one of: digital video from the video decompressor 102, the closed caption data byte sequences from the closed caption data embedder 114, or the CCIR-656 synchronization codes (SAV, EAV . . . ).

The multiplexer 100 in this embodiment has three inputs: digital video from the video decompressor 102; CCIR-656 SAV, EAV information from the synchronization module 140; and the closed caption data byte sequence from the closed caption data embedder 114. The synchronization module 140 informs the multiplexer 100 when to output the proper bytes.

In the embodiment of FIG. 10, the closed caption data embedder 114 receives a signal 'CC_select' from the synchronization module 140 that informs the embedder 114 when to issue the closed caption byte sequence. Since it does not control multiplexer 100, the closed caption data embedder 114 in this embodiment does not generate the Embedded_CC_select output signal, in contrast to the embodiment of FIG. 8. Additionally, the byte sequence out of the closed caption data embedder 114 in the embodiment of FIG. 10 is 0, 254 instead of 0, 255. The values 0, 254 form the CCIR-656 start sequence for SAV and EAV from the synchronization module 140.

Figure 11:
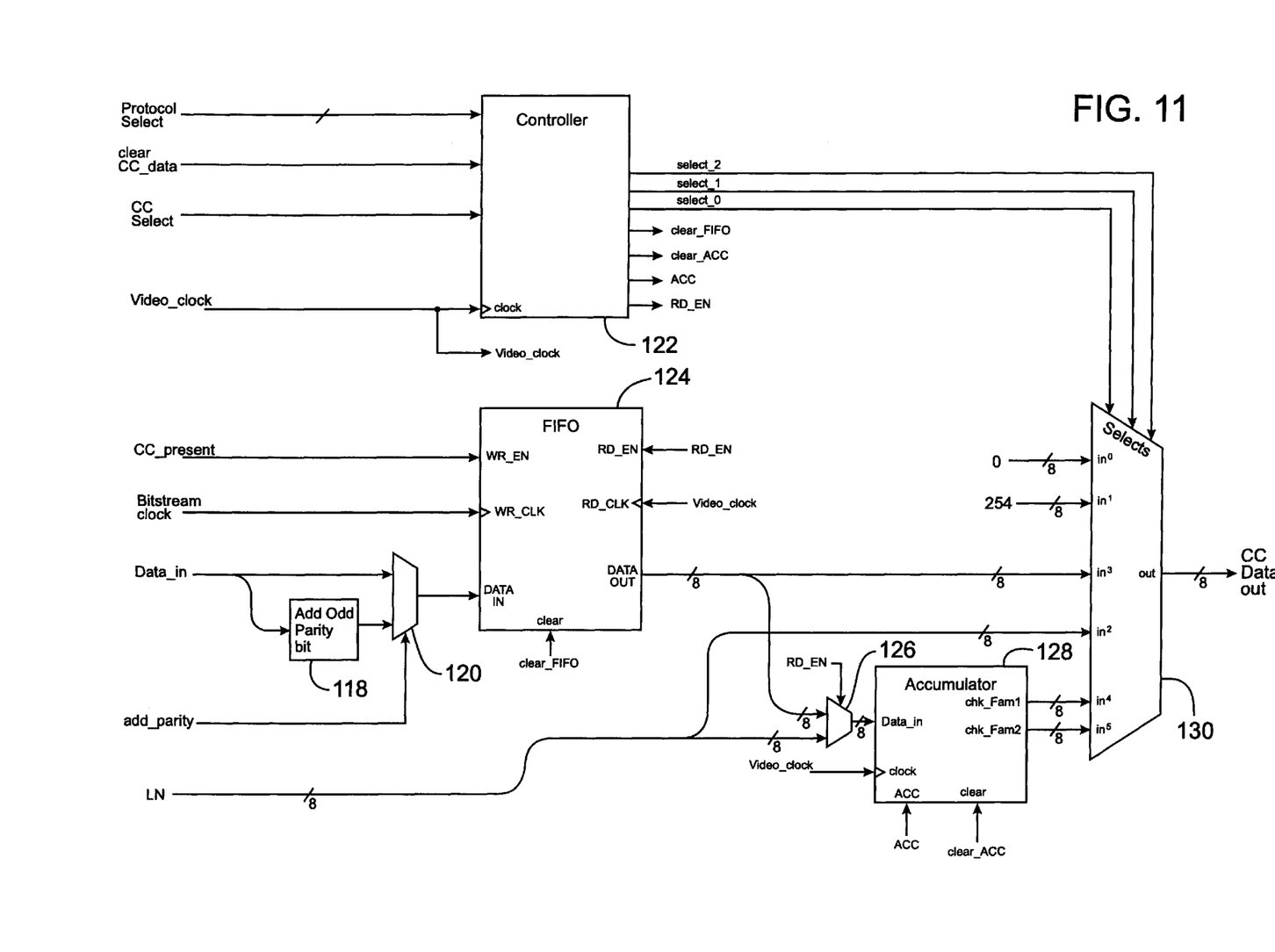
FIG. 11 is a block diagram of a closed caption data embedder constructed in accordance with an embodiment of the present invention and used in the video decoder of FIG. 10.

The embodiment of the closed caption data embedder 114 used in the embodiment of the video decoder of FIG. 10 is depicted in FIG. 11. Its operation is similar to the embodiment of the data embedder of FIG. 9, with the exceptions as noted above in the description of the video decoder 44 of FIG. 10.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A video decoder for receiving a compressed digital video stream and generating a single decompressed digital video signal with embedded closed caption digital data therefrom to be provided to an analog video encoder, the video decoder comprising:

a video decompressor that decompresses the compressed digital video stream to generate a decompressed digital video signal;

a closed caption data embedder that produces closed caption digital data contained in the compressed digital video stream for embedding into the digital video output signal; and a single video signal output port, coupled to the video decompressor and the closed caption data embedder, producing the single digital video output signal comprising the decompressed digital video signal and the embedded closed caption digital data to be provided to the analog video encoder contemporaneously.

2. The video decoder of claim 1, further comprising a user data type detector that detects closed caption digital data in the compressed digital video stream and generates a signal to cause said closed caption data embedder to process the closed caption digital data in the compressed digital video stream.

3. The video decoder of claim 2, further comprising a user data start code detector that detects the presence of user data in the compressed digital video stream and generates a control signal in response to detection of user data, any closed caption data being contained within the user data.

4. The video decoder of claim 3, further comprising a first multiplexer that receives the compressed single digital video stream and selectively routes the compressed digital video stream to either the video decompressor or the user data type detector and the closed caption data embedder as a function of the control signal generated by the user data start code detector.

5. The video decoder of claim 4, further comprising a second multiplexer having:

a first input receiving the decompressed digital video signal from the video decompressor;

a second input receiving the closed caption digital data from the closed caption data embedder, a single output which forms the single video signal output port, and a select input receiving a control signal to control selection between the first and second inputs to be provided as the digital video output signal at the single video signal output port.

6. The video decoder of claim 5, wherein the video decompressor has a video synchronization signal input to slave the video decoder to external video synchronization signals.

7. The video decoder of claim 6, wherein the closed caption data embedder includes a control signal output at which the control signal received by the select input of the second multiplexer is produced.

8. The video decoder of claim 6, wherein the compressed digital video stream is in CCIR-601 format.

9. The video decoder of claim 5, wherein the second multiplexer has a third input, and further comprising a synchronization generator that generates synchronization signals that synchronize the video decompressor, start of active video and end of active video codes received at the third input of the second multiplexer, and a control signal received at the control signal input of the second multiplexer to control selection between the first, second and third inputs.

10. The video decoder of claim 9, wherein the compressed digital video stream is in CCIR-656 format.

11. A method of converting a compressed digital video bitstream into a single digital output signal having decompressed video output with embedded closed caption data, the method comprising:

receiving a compressed digital video bitstream;

detecting closed caption digital data in the digital video bitstream;

decompressing the digital video bitstream to a decompressed digital video output;

providing the decompressed digital video output to a single output port for delivery of the single digital output signal to an analog video encoder; and embedding the detected closed caption digital data in the decompressed digital video output to form the single digital output signal at the single output port for contemporaneous delivery of the single digital output signal to the analog video encoder.

12. The method of claim 11, wherein the step of detecting closed caption digital data includes detecting a user start code within the compressed digital video bitstream, and determining a type of user data in the compressed digital video bitstream upon detection of a user start code.

13. The video decoder of claim 1, further comprising a multiplexer having:

a first input receiving the decompressed digital video signal form the video decompressor, a second input receiving the closed caption digital data from the closed caption data embedder, a single output which forms the single video signal output port, and a select input receiving a control signal to control selection between the first and second inputs to be provided as the digital video output signal at the single video signal output port.

14. In a system for converting a compressed digital video input stream to an analog signal usable by a television including a transport demultiplexer receiving the compressed digital video input stream and providing an audio stream and a compressed digital video stream for processing to be usable by the television, a video decoder for receiving the compressed digital video stream and generating a decompressed digital video signal and an analog video encoder for receiving the decompressed digital video stream and generating an analog video signal for display by the television, the improvement wherein:

said video decoder generates said decompressed digital video signal including therein closed caption digital data to be provided to the analog video encoder, the video decoder comprising:

a video decompressor that decompresses the compressed digital video stream to generate a decompressed digital video signal;

a closed caption data embedder that produces closed caption digital data from the compressed digital video stream, the closed caption digital data being embedded into a digital video output signal of the video decoder; and a single video signal output port, coupled to the video decompressor and the closed caption data embedder, the single video signal output port providing the single digital video output signal comprising the decompressed digital video signal and the embedded closed caption digital data to the analog video encoder contemporaneously.

15. The video decoder of claim 14, further comprising a multiplexer having:

a first input receiving the decompressed digital video signal from the video decompressor, a second input receiving the closed caption digital data from the closed caption data embedder, a single output which forms the single video signal output port, and a select input receiving a control signal to control selection between the first and second inputs to be provided as the digital video output signal at the single video signal output port.

* * * * *